US009672844B2

(12) United States Patent
Pinhas

(10) Patent No.: US 9,672,844 B2
(45) Date of Patent: Jun. 6, 2017

(54) PORTABLE TURNTABLE DEVICE, SYSTEM, AND METHOD

(71) Applicant: LOVE TURNTABLE, INC., Los Angeles, CA (US)

(72) Inventor: Charles-Henri Pinhas, Los Angeles, CA (US)

(73) Assignee: Love Turntable, Inc., Los Angeles, CA (US)

( * ) Notice: Subject to any disclaimer, the term of this patent is extended or adjusted under 35 U.S.C. 154(b) by 0 days.

(21) Appl. No.: 15/403,001

(22) Filed: Jan. 10, 2017

(65) Prior Publication Data

US 2017/0125039 A1 May 4, 2017

Related U.S. Application Data

(63) Continuation-in-part of application No. 15/215,458, filed on Jul. 20, 2016, now Pat. No. 9,583,122.

(60) Provisional application No. 62/194,924, filed on Jul. 21, 2015.

(51) Int. Cl.
| | | |
|---|---|---|
| G11B 17/00 | (2006.01) | |
| G11B 3/60 | (2006.01) | |
| G11B 3/46 | (2006.01) | |
| G11B 21/00 | (2006.01) | |

(52) U.S. Cl.
CPC ............. *G11B 3/60* (2013.01); *G11B 3/46* (2013.01); *G11B 17/00* (2013.01); *G11B 21/006* (2013.01)

(58) Field of Classification Search
CPC .............................. G11B 17/00; G11B 17/04
USPC .......... 720/724; 369/95, 272.1, 275.1, 275.5, 369/280, 283
See application file for complete search history.

(56) References Cited

U.S. PATENT DOCUMENTS

| | | | |
|---|---|---|---|
| 1,462,867 A | 7/1923 | Meyer et al. | |
| 3,181,870 A | 5/1965 | Lasswell, Jr. | |
| 3,360,269 A | 12/1967 | Dunn | |
| 3,482,841 A | 12/1969 | Doring | |
| 4,086,617 A * | 4/1978 | Baker ................ | G11B 3/08529 369/126 |
| 4,166,624 A | 9/1979 | Mori et al. | |
| 4,232,202 A | 11/1980 | Mori et al. | |
| 4,360,906 A | 11/1982 | Shitama | |
| 4,498,164 A | 2/1985 | Lebensfeld | |

(Continued)

FOREIGN PATENT DOCUMENTS

| | | |
|---|---|---|
| JP | 3130648 | 4/2007 |
| KR | 1020090010813 | 1/2009 |

OTHER PUBLICATIONS

Korean Intellectual Property Office, International Search Report, Oct. 18, 2016, 3 pages.

(Continued)

*Primary Examiner* — Allen T Cao
(74) *Attorney, Agent, or Firm* — Hankin Patent Law, APC; Kevin Schraven; Anooj Patel

(57) ABSTRACT

A turntable device, comprising: a spindle and two arms. The two arms may comprise: a housing; one or more buttons; a spindle engagement portion; a stylus cartridge; a power supply; one or more wireless communication devices; a linear actuator; a motor; and a vertical solenoid. The spindle may receive a phonographic record, and the spindle engagement portion may engage with the spindle, such that the arms are entirely supported via said spindle and only the spindle.

18 Claims, 9 Drawing Sheets

(56) References Cited

U.S. PATENT DOCUMENTS

| | | |
|---|---|---|
| 4,740,945 A | 4/1988 | Doring |
| 6,477,128 B1 | 11/2002 | Ma |
| 9,266,376 B1 | 2/2016 | Mah |
| 2004/0005138 A1 | 1/2004 | Yano et al. |
| 2007/0061825 A1 | 3/2007 | Te et al. |

OTHER PUBLICATIONS

Korean Intellectual Property Office, Written Opinion of the International Searching Authority, Oct. 18, 2016, 4 pages.

* cited by examiner ized
PORTABLE TURNTABLE DEVICE, SYSTEM, AND METHOD

CROSS-REFERENCE TO RELATED APPLICATIONS

This Application is a continuation-in-part of U.S. Non-Provisional patent application Ser. No. 15/215,458, filed on Jul. 20, 2016, titled "Portable Turntable Device, System, and Method", by sole inventor Charles-Henri Pinhas, the contents of which are expressly incorporated herein by this reference as though set forth in their entirety. U.S. Non-Provisional patent application Ser. No. 15/215,458 claims the benefit of U.S. Provisional Patent Application No. 62/194,924, filed on Jul. 21, 2015, titled "Portable Record Player System and Method", by sole inventor Charles-Henri Pinhas, the contents of which are expressly incorporated herein by this reference as though set forth in their entirety.

FIELD

The present disclosure relates generally to devices and methods for reading and transmitting data from disc-shaped media, and more particularly, to one or more portable record playing systems for reading and transmitting sonic data from a phonograph record disk wherein the disk remains stationary.

BACKGROUND

Music players such as phonographs and gramophones have existed since the late 19th century. While earlier versions of record players lacked fidelity, record players improved substantially throughout the 20th century, eventually producing an optimal balance of sound fidelity and a soulful quality. However, once music players migrated away from the use of vinyl disks and towards modern digital mobile music devices, the soulful sound quality that is unique to vinyl records appeared to be lost forever.

For those music aficionados that have continued to play vinyl records, conventionally available record players include certain deficiencies. For example, traditional record turntables are typically large, rectangular, and heavy. Although portable record players are currently available, these devices typically incorporate an integrated speaker that produces poor sound quality. Moreover, some past portable record players apply undesirable pressure directly to the face of record. In the 1970s, some of these portable record players were often referred to as "Vinyl Killers", which are generally portable record players, resembling a vehicle, that scan the record while traveling around the record. These portable record players were known as Vinyl Killers because the records likely became damaged due to the fact that the weight of the portable record player sat directly on the record. While certain high-price portable turntable devices are available, these devices lack automatic and wireless features. These devices are also complex, made for professionals, and are generally unavailable to the typical vinyl record consumer.

In the late 1990s, the music industry essentially stopped the mass market production and sale of vinyl records, with the exception of sales to professional DJs. Recently, however, the demand has been rising for vinyl records. In response to this demand, the financially-struggling record companies have started producing and selling vinyl records on a mass market basis, including both new artists and superstar artists. Record companies have begun releasing vinyl singles, while independent artists have begun releasing vinyl records once given the opportunity. There are now numerous vinyl record re-releases of previously-released and unreleased albums and singles.

This strong reemergence of vinyl has become so popular that it is no longer considered to be a fad or a niche market. It has become apparent, however, that very few vinyl consumers are interested in buying new turntables because turntables are too large, difficult to set up, and arduous to use on a daily basis. Furthermore, turntables are generally incompatible with smart phone/multimedia devices. Regarding those rare wireless turntables, these turntables typically include an FM signal which is an utterly unnecessary feature.

Based on the foregoing, what is needed is an improved, portable record playing device, system, and method for reading data from a stationary vinyl record and wirelessly interfacing with a computing device in a manner which is intuitive and user friendly. The device will preferably minimize the weight applied to the face of the record and will capture the soulful sound qualities of the vinyl record. Features such as one-touch operation and the ability to remotely control the position of the stylus over the face of the record via the interfaced computing device may also be preferable.

SUMMARY OF EMBODIMENTS

To minimize the limitations in the cited references, and to minimize other limitations that will become apparent upon reading and understanding the present specification, the present specification discloses a new and improved portable turntable device. The portable turntable preferably comprises a base, an arm that interconnect around a vinyl record, wherein the arm revolves around the turntable, and speakers, wherein the speakers may be adapted to store the turntable.

One embodiment may be a turntable device for playing both sides of a record simultaneously, comprising: a spindle; and two arms, a first arm and a second arm, each arm comprising: a housing; one or more buttons; a spindle engagement portion; a stylus cartridge; a power supply; one or more wireless communication devices; a linear actuator; a motor; and a vertical solenoid. The spindle may be adapted to operatively engage with a phonographic record and the two arms. The first arm may be positioned above the phonographic record and the second arm may be positioned below the phonographic record. The spindle engagement portions of the two arms may engage with the spindle, such that the phonographic record may be entirely supported above the second arm via the spindle and the second arm may be entirely supported above the phonographic record via the spindle. The first arm may play a top side of the phonographic record at the same time that the second arm plays an underside of the phonographic record. Within each of the two arms the linear actuator may be configured to move the stylus cartridge along a length of the two arms, and within each of the two arms the vertical solenoid may be configured to allow a stylus of the stylus cartridge to engage with the phonographic record. Each of the two arms may further comprise one or more sensors, wherein the one or more sensors may be configured to cause the linear actuator to move the stylus cartridge along the length of one of the two arms in order to begin a desired track on the phonographic record. The two arms are may be configured to automatically determine a speed of the phonographic record. Each of the two arms may further comprise a speed switch that allows a user to manually select a revolution speed that conforms with a speed of the phonographic record. The one or more buttons may be a single button (which may be a touch sensitive material, not an actual mechanical button) that allows a user to control a plurality of operating functions of the two arms. The plurality of operating functions of the two arms may be selected from the group of operating functions consisting of: turning on; turning off; selecting the desired track; skipping one or more tracks; pausing; or muting. The one or more buttons may be a display touch screen. The display touch screen may allow a user to control a plurality of operating functions of the two arms. The plurality of operating functions of the two arms may be selected from the group of operating functions consisting of: turning on; turning off; selecting the desired track; skipping one or more tracks; pausing; or muting. In one embodiment, each of the two arms may further comprises a display, wherein the phonographic record may have a plurality of tracks, and wherein the display may show which track of the plurality is currently being played. The two arms may further comprise a circuit board, wherein the one or more wireless communication devices may be coupled to the circuit board and may be configured to send and receive signals from one or more computing devices. The one or more computing devices may comprise a software application, wherein the software application may be configured to allow a user to control a plurality of operating functions of the two arms from the one or more computing devices. The plurality of operating functions of the two arms may be selected from the group of operating functions consisting of: turning on; turning off; selecting the desired track; skipping one or more tracks; selecting a record speed; alarm clock function; pausing; or muting. The one or more computing devices may be one or more mobile smartphones. Each of the two arms may be configured to send or receive data or sound to an external device, wherein the external device may be selected from the group of external devices consisting of: speakers; headphones; or one or more computing devices. In one embodiment, the external device may be one or more speakers, which may have a substantially hollow interior. The substantially hollow interior of the one or more speakers may be used as a storage receptacle for the turntable device, and the storage receptacle may hold at least one arm and at least one base.

Another embodiment may be a turntable device, comprising: a base; two speakers; a spindle; and at least one arm, the at least one arm comprising: a housing; one or more buttons; a spindle engagement portion; a stylus cartridge; one or more wireless communication devices; a linear actuator; and a vertical solenoid The base may be adapted to receive a phonographic record. The spindle engagement portion may be configured to engage with the spindle. The arm may be configured to revolve around the base at the spindle. The linear actuator may be configured to move the stylus cartridge along a length of the arm. The vertical solenoid may be configured to allow a stylus of the stylus cartridge to engage with the phonographic record that is loaded on the base. Each of the two speakers may have a substantially hollow interior, such that the two speakers, when combined, may be configured to receive and store the arm, the spindle, and the base. The arm further may comprise one or more sensors, wherein the one or more sensors may be configured to cause the linear actuator to move the stylus cartridge along the length of the arm in order to begin a desired track on the phonographic record. The arm may be configured to automatically determine a speed of the phonographic record.

It is an object to overcome the limitations of the prior art.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

In the following detailed description of various embodiments, numerous specific details are set forth in order to provide a thorough understanding of various aspects of the embodiments. However, these embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

Figure 1:
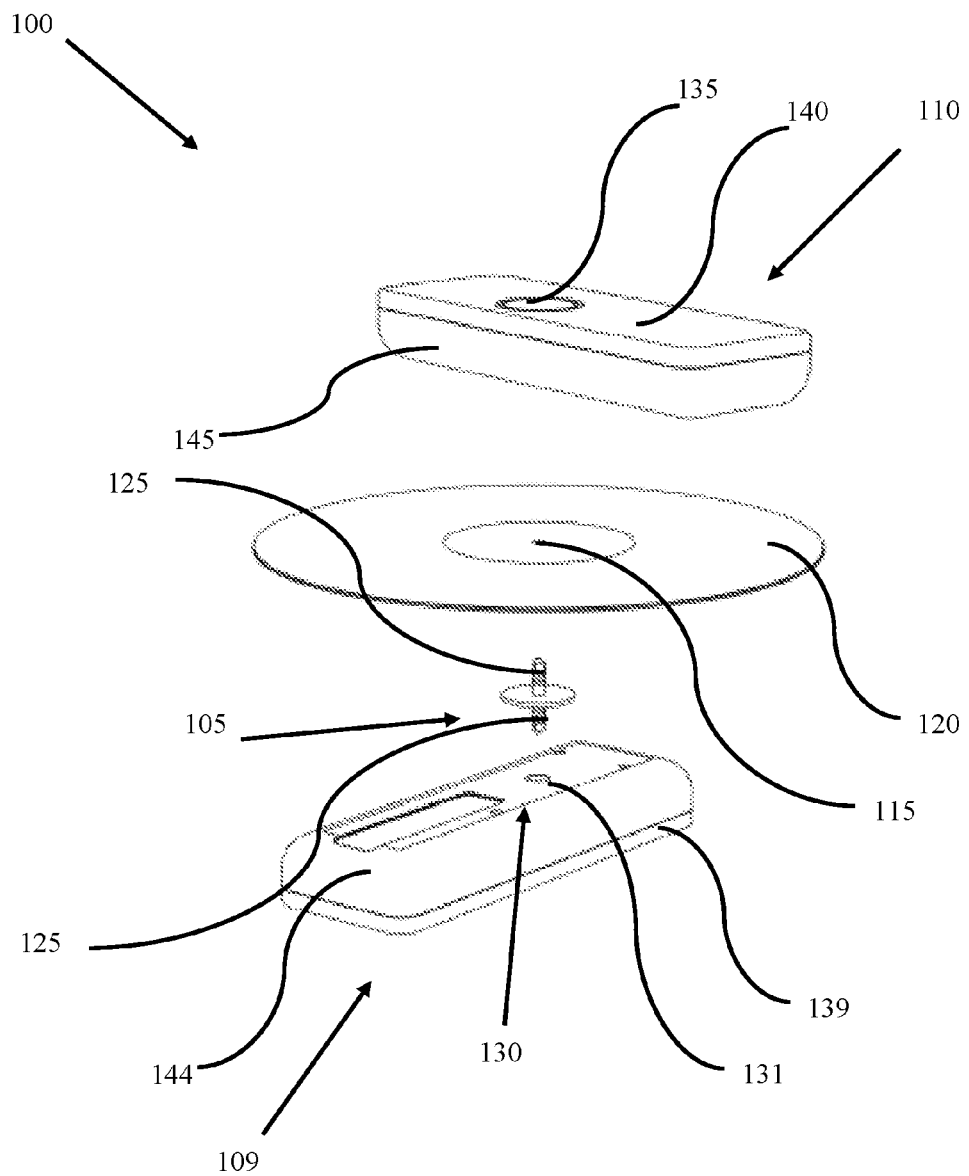
FIG. 1 is an illustration of an exploded perspective view of one embodiment of a turntable device comprising two arms.

FIG. 1 is an illustration of an exploded perspective view of one embodiment of a turntable device comprising two arms. As shown in FIG. 1, the turntable device 100 may comprise a center spindle 105 and two arms 109, 110. The turntable device 100 is preferably configured to engage records, vinyl records, and phonographic discs of various sizes. The spindle 105 is preferably adapted to engage and pass through the center hole 115 of a record 120 that is positioned between the arms 109, 110. The spindle 105 may also be adapted to hold and support the arms 109, 110 when the arms 109, 110 are engaged with the spindle 105.

FIG. 1 shows that the bottom housing 144, 145 of the arms 109, 110 may comprise a spindle engagement portion 130. The spindle engagement portion 130 may be part of or integrated with the housing 144, 145. Alternatively, the spindle engagement portion 130 may be an internal component that is accessed through a hole or aperture 131. Preferably, the distance between the spindle engagement portion 130 and the distal edge of the housing 144, 145 is long enough to allow the arms 109, 110 to fully engage with a 10" diameter record. Moreover, the spindle engagement portion 130 is preferably located at a balanced point between the two edges, such that the arms 109, 110 can rest and be entirely supported by the spindle 105.

FIG. 1 also shows that the spindle 105 may comprise arm engagement keys 125. The arm engagement keys 125 may be adapted to engage with and secure the arms 109, 110, such that, when the spindle 105 rotates, the arms 109, 110 likewise may rotate around the record 120 in a connected and secured manner. In one embodiment, the spindle 105 may transmit and receive data and sound. In another embodiment, the spindle 105 may be passive, such that the spindle 105 merely serves as a physical support that engages with the arms 109, 110.

In one embodiment a software application controls the two arms 109, 110. The arm 109 that is upside down acts as a base. One side of the record 120 is played by the top arm 110, which spins on top of the record 120. The other side of the record 120 is played by the bottom arm 109, with the record spinning on the arm 109. In another embodiment, both arms 109, 110 may be stationary, while the record 120 is spun by the spindle 105.

The arms 109, 110 may also comprise a linear actuator adapted to move a stylus cartridge along the length of the arms 109, 110. This may allow the stylus to be placed at the appropriate location to play the desired track of the album. Conversely, the stylus cartridge may also be free to move inwardly in a linearly manner within the arms 109, 110 as the record is played. The stylus cartridge may be suspended with mounting hardware, such that external bumps or vibrations will not necessarily disturb the playback of the record. This is also referred to as a head tracking system. In one embodiment, the linear actuator may be a system utilizing a solenoid linear motor that provides strokes with constant force over a short limited distance. In another embodiment, the linear actuator may lack a solenoid linear motor, but may utilize electromagnets. Still, in another embodiment, the linear actuator may utilize a rotational motor with a screw system. The arms 109, 110 may also comprise a vertical solenoid, which may be coupled to the arms 109, 110 or integrated into the arms 109, 110. The vertical solenoid may also be configured to move the arms 109, 110 up and down by pivoting the arms 109, 110 vertically with respect to the linear actuator. This movement may allow the stylus cartridge attached to the arms 109, 110 to move onto the record.

In other embodiments, the arms 109, 110 may also comprise one or more support wheels adapted to engage within the inner circle of the record 120 (e.g., inside label of the record).

Further, the arms 109, 110 may comprise one or more magnets. For example, in one embodiment, the arms 109, 110 may comprise magnets that substantially cover the entire arm arms 109, 110. Alternatively, the magnets may be disposed at strategic locations. The purpose of the magnets may be used to support the arms 109, 110 as the arms 109, 110 spin around the record 120. One or more magnets in arm 109 may interact with one or more magnets in arm 110. This may allow the magnets to smoothly apply a repulsing magnetic force against the arms 109, 110 as the arms 109, 110 spin around the record 120. In this manner, the arms 109, 110 may be supported without contacting or applying pressure to the record 120 being played.

The turntable device 100 may be configured to wirelessly transmit the sound through CD quality compression Bluetooth® APTX HD (simple codec) or Bluetooth® APTX HD (newer codec) (+Apple compatible AAC) Codec and/or through other universal formats. Additionally, a wired option may come from the factory, for example, in the form of a line out jack configured to receive a small line out connector for one or more speakers. In the alternative, a wired option can come as an accessory with the turntable device 100. Bluetooth® may be used for high fidelity audio and data/remote functions. Simple auto pairing may be implemented with last generation Bluetooth® 4.0 or later (i.e., no pairing security code required).

Like several early 1980s turntables, some of which were then called "programmable," embodiments in accordance with the present turntable device 100 may be configured to skip track, play randomly, and/or be programmed to play vinyl records. Unlike early 1980s turntables, the key difference is that embodiments of the present disclosure may perform these functions remotely, through its dedicated software App operating, for example, on the user's own mobile computing device. This can also be done intuitively through a single button 135 located on a top housing 139, 140 of the arms 109, 110. In various embodiments, this multi-function button 135 may allow the turntable device 100 to be powered on and to play (one single button press), skip to the next track (one more press, and following track each time pressed) and then turn off (e.g., by way of one long button press).

Figure 2:
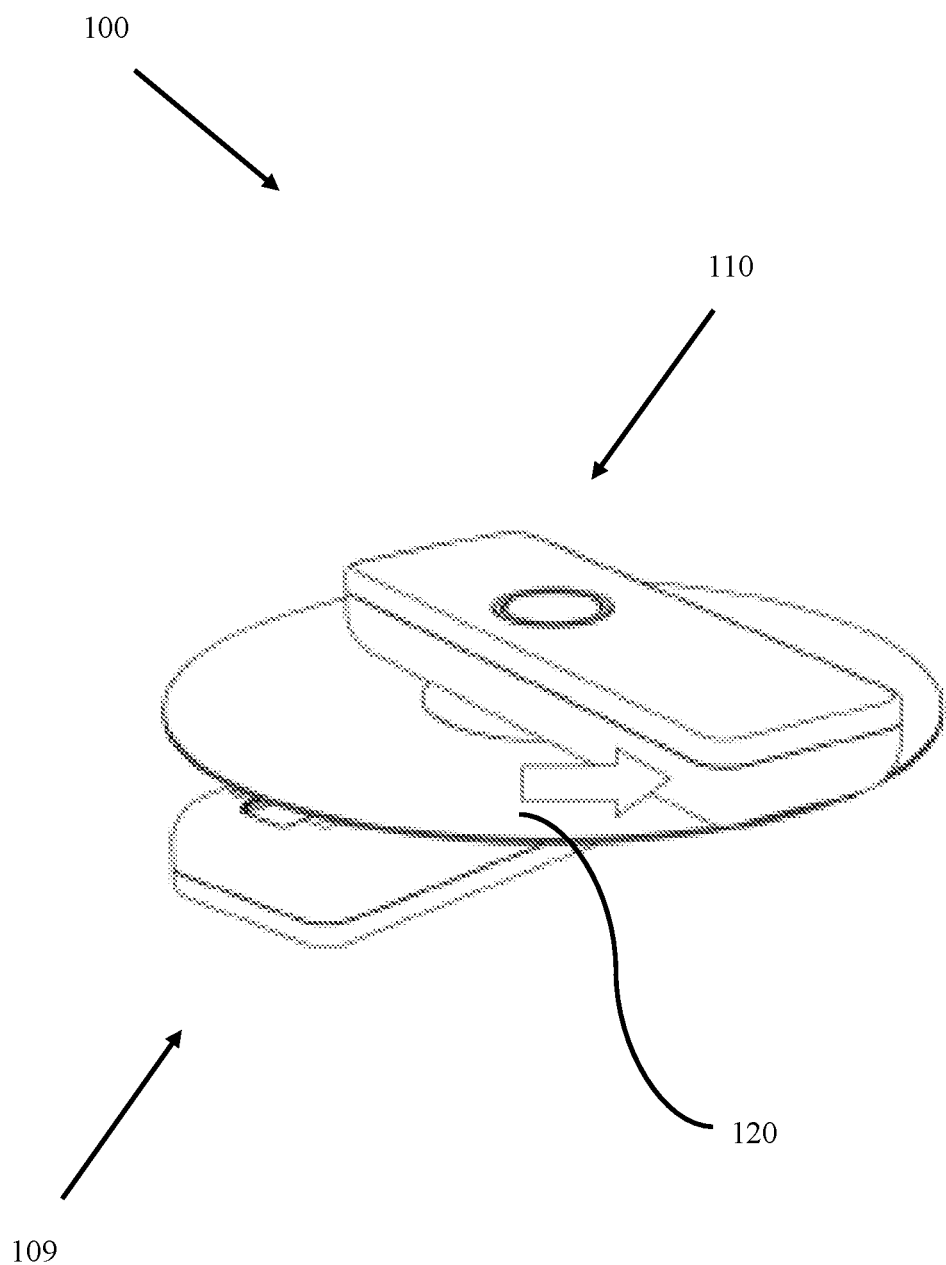
FIG. 2 is an illustration of a perspective view of one embodiment of a turntable device comprising two arms.

FIG. 2 is an illustration of a perspective view of one embodiment of a turntable device comprising two arms. When the arms 109, 110 are coupled or connected to the spindle, the arms 109, 110 may rotate, usually in a counter-clockwise motion, around the record 120. A motor, which drives the arms 109, 110 around the record 120, may be powered by a battery such as a lithium-ion battery. But, any type of battery may be used. Alternatively, the motor and/or arms 109, 110 may be powered by alternating current via an A/C adapter.

In various embodiments, the arms 109, 110 may rotate around the record 120 concurrently. Alternatively, arm 109 may rotate around the record 120 at a different time or direction than arm 110. In various embodiments, only the record 120 may spin while the arms 109, 110 remain in place. In this manner, the motor may require less power. In other embodiments, both the top arm 110 and the record may spin to have both arms playing the record 120 at the same time.

When assembled, the arms 109, 110 may include one or more holes 131 and/or a spindle engagement portions 130 that allow the arms 109, 110 to secure onto the spindle. Specifically, in one embodiment, the spindle engagement portion 130 may comprise a female portion, and the spindle may comprise a male portion. The female portion of the spindle engagement portion 130 may be adapted to engage and couple with the male portion of the spindle 105 by sliding the female portion onto the male portion vertically. In this manner, the female portion and male portion may be rotationally locked relative to each other in the horizontal plane (i.e., the female portion and male portion cannot rotate relative to each other). Thus, the spindle 105 may hold and support the arms 109, 110 in an appropriate and playable configuration.

Figure 3:
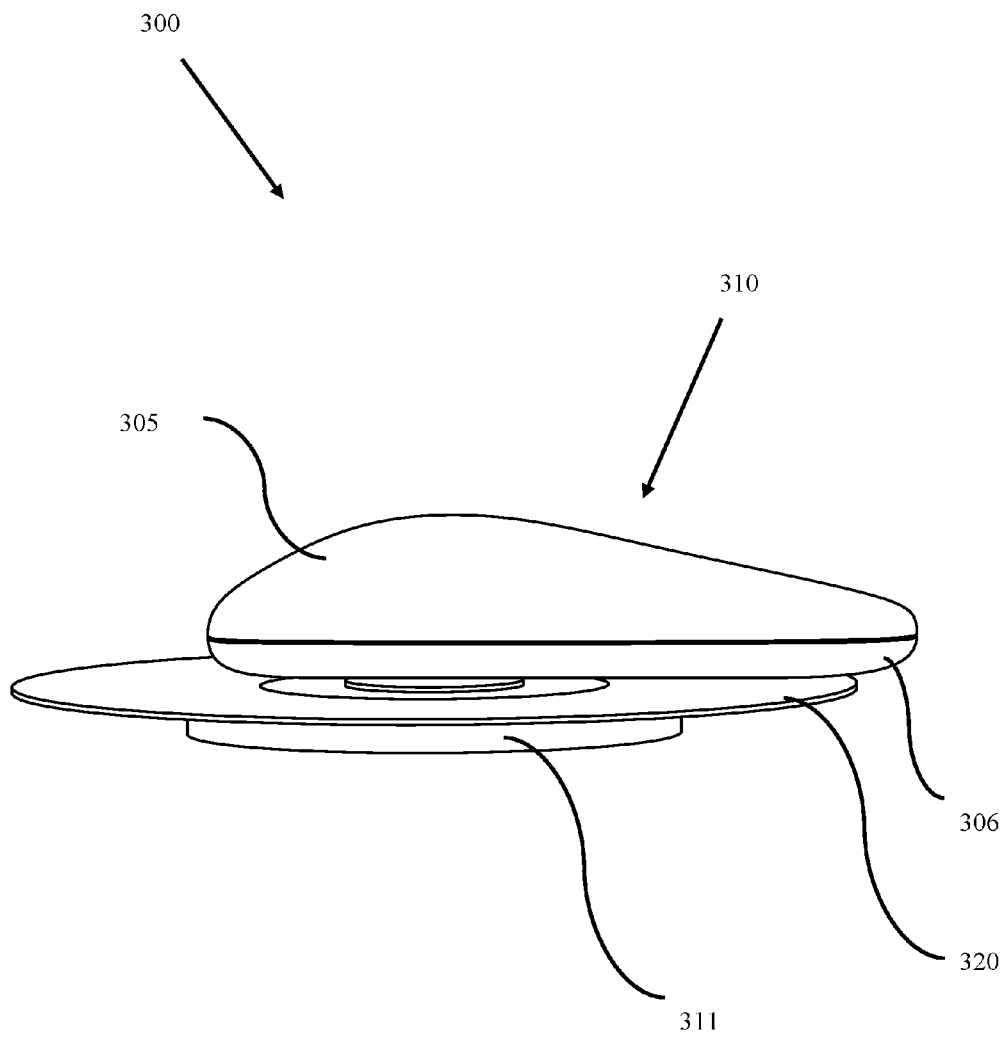
FIG. 3 is an illustration of a left side view of one embodiment of the turntable device showing one design of the arm.

FIG. 3 is an illustration of a left side view of one embodiment of the turntable device showing one design of the arm. As shown in FIG. 3, one embodiment of the turntable device 300 may comprise: an arm 310 and base 311 and may be an attractive and sleek ornamental design. The arm 310 may comprise: a top housing 305, a bottom housing 306, light emitting diode (LED) display, and a button. The arm 310 may be generally rectangular or an extended shape, but any shape or design may be used. In various embodiments, the arm 310 may be approximately 7-11" long (about 10" is preferred), 2-3" wide, and 0.5 to 3 inches thick. FIG. 3 shows that the top housing 305 and bottom housing 306 may engage and fit together to securely hold and protect the inner electronic and mechanical components of the turntable device 300. The top housing 305 may comprise a button such that a substantial portion, or even the entirety, of the top housing 305 may be clickable and may serve as the primary user interface with the turntable device 300. In one embodiment, the button may be a mechanical button. The button may be a one way push button used for activating and/or operating the turntable device 300. When depressed, the button may activate a switch to power the device 300 on/off. The switch, which may be electronically coupled to a circuit board, may also serve to mute the device, skip a track, or select a specific track. Alternatively, the button may be a capacitive sensor, which may be able to detect and measure the proximity, position, or displacement of a user's touch.

Furthermore, an embodiment of the button may be configured to be pushed normally without the actuating action affecting the playback of the record 320 by the arm 310. In other words, in the event a record 320 is being played and the user pushes the button 315, the record 320 will not be damaged and the playback will not be disturbed. Various suspension mechanisms and internal component mounting hardware may also allow the button 315 to be operated without having a significant effect on the housings 305, 306. In other embodiments of the turntable device 300, the addition of swiveling components and location of button placements are also contemplated to help minimize the effect on the housings 305, 306 when the button is operated.

When assembled, the bottom housing 306 may include a hole and/or a spindle engagement portion that allows the turntable device 300 to secure onto the spindle. When the arm 310 is coupled or connected to the spindle, the arm 310 may rotate, usually in a counter-clockwise motion, around the base 311. Alternatively, when two arms are used, the arm 310 may rotate around a record 320. A motor, which may drive the arm 310 around the base 311 or a record 320, may be powered by a battery such as a lithium-ion battery. But, any type of battery may be used. Alternatively, the motor and/or arm 310 may be powered by alternating current via an A/C adapter.

As discussed above, in one embodiment, the arm 310 may comprise one or more magnets that magnetically interact with one or more magnets of the base 311 or a second arm. This may allow the arm 310 to be further supported without any other contact point other than the spindle.

FIG. 3 shows how the ornamental design of the arm 310 may concentrate the weight of the interior components at a location just above the spindle engagement portion, which allows the balance of the arm 310 to be more easily maintained above the record 320.

Figure 4:
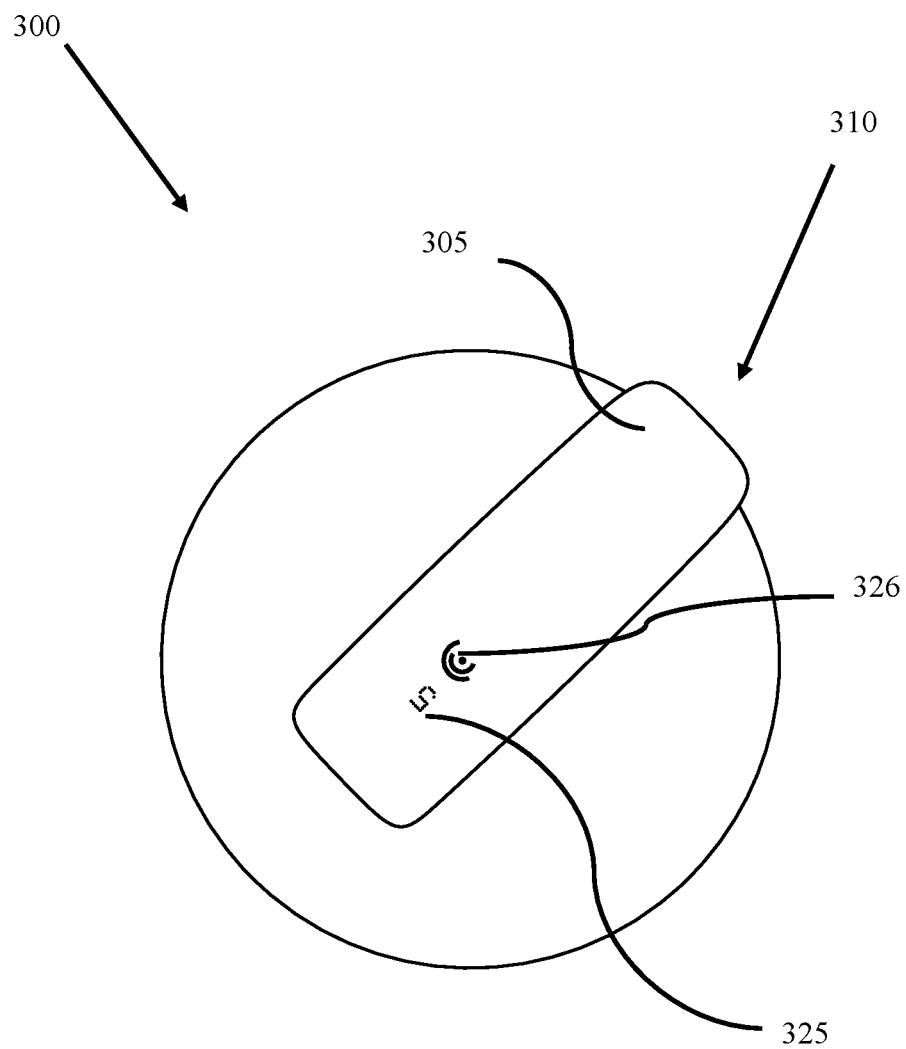
FIG. 4 is an illustration of a top perspective view of one embodiment of an arm of the turntable device showing the track number displayed.

FIG. 4 is an illustration of a top perspective view of one embodiment of an arm of the turntable device showing the track number displayed. As shown in FIG. 4, the top housing 305 of the arm 310 may comprise a button 326. In addition to, instead of, or next to the button 310 that activates an internal switch, there may be a display touch screen 325, which may be separate to or part of button 326. The display touch screen 325 may be a LCD or LED screen with touch sensitivity, or it may simply be a digital display. The display 325 may allow the user to be able to operate the turntable device 300 through a touch screen interface. The display touch screen 325 may be used for multiple purposes for multiple functions. The display touch screen 325, for instance, may be used as an ON/OFF switch. The display touch screen may also be used for selecting the speed of the arm 310 as well as displaying the actual speed (e.g., 45 rpm). Preferably, the display touch screen will provide more feedback by displaying additional information and including additional interface control (e.g., multiple buttons).

In one embodiment, the display 325 may be a digital display that displays the track number being played. The display 325 changes as the track changes or is changed by pushing the button 326.

Figure 5:
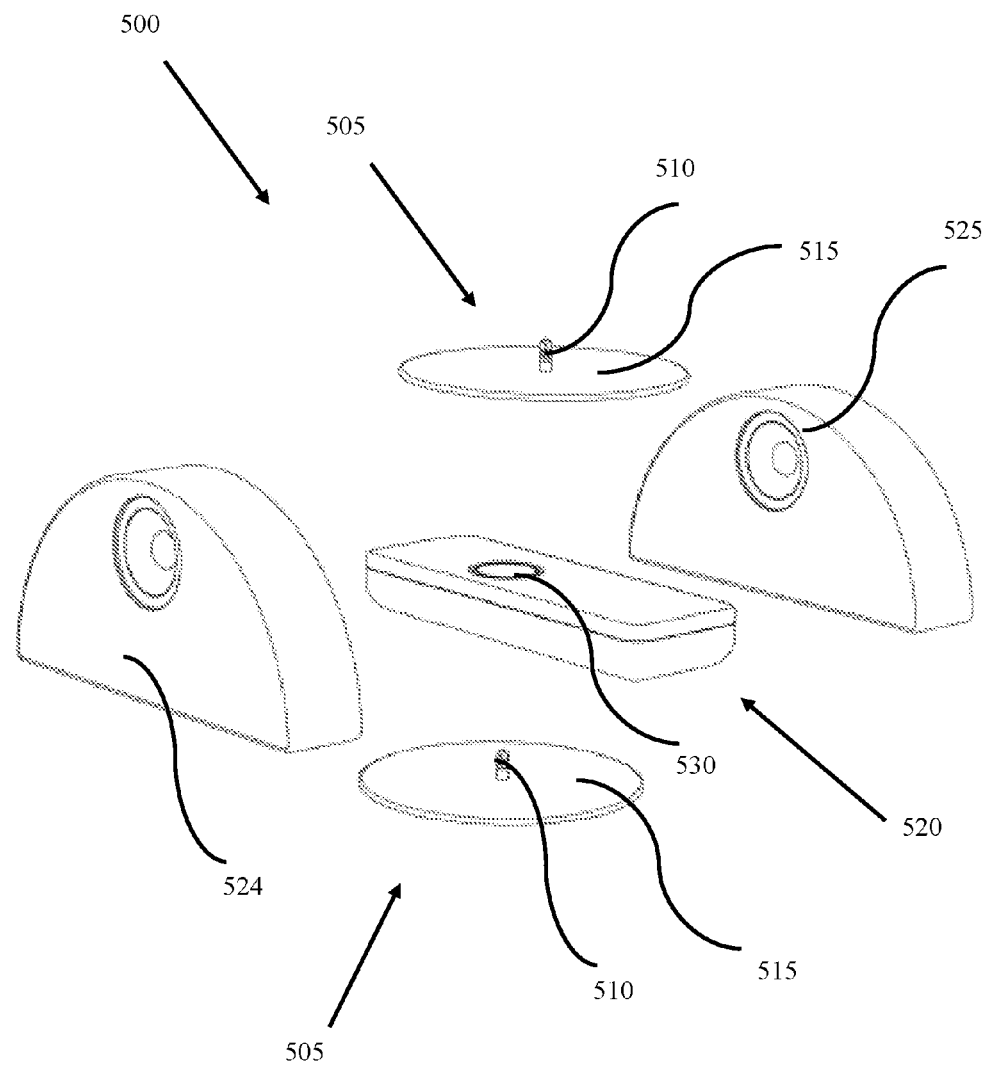
FIG. 5 is an illustration of a perspective view of one embodiment of a turntable device with speakers.

FIG. 5 is an illustration of a perspective view of one embodiment of a turntable device with speakers. FIG. 5 shows that turntable device 500 may comprise a base 505, the base 505 may be circular or disc-shaped and is preferably configured to engage records, vinyl records, and phonographic discs of various sizes. In various embodiments, the base 505 may different sizes. For instance, in one embodiment, the based 505 may be approximately 7" in diameter. In another embodiment, the base 505 may be approximately 12" in diameter, or larger. In other embodiments, the base 505 may be an existing turntable with a dedicated post or spindle. The base 505 may be larger than 12" in diameter so that supporting wheel(s) may engage with the base, rather than with an end of a record to be played.

The base 505 may also comprise a spindle 510 located at the center of the pad 515. The spindle 510 is preferably adapted to engage and pass through the center hole of a record that is placed on the base 505. The spindle 510 may also be adapted to hold and support the arm 520 when the arm 520 is engaged with the spindle 510.

In one embodiment, the arm 520 may comprise one or more wireless communication devices, such as a transmitter, receiver, and/or a transceiver that may operate on any wireless platform, including, but not limited to: Wi-Fi, infrared, LTE, LTE Advanced, Bluetooth® (short-wavelength UHF radio waves) and/or Miracast®. Because the arm 520 may communicate wirelessly, the turntable device 500 may be programmed or controlled by an external computing device. In one embodiment, the external computing device may be a mobile smartphone utilizing a software application (the "App") that allows the smartphone to communicate with, receive sound from, and/or control the turntable device.

The wireless device may allow the arm 520 to auto pair with speakers 524, 525, headphones, or a computing device, in order to transmit the playback sound of the record being played. In one embodiment, the arm 520 may wirelessly pair via a Bluetooth® connection.

In one embodiment, the method of playing a record using the turntable device 500 may comprise the steps of: (1) placing the record on the base; (2) setting by the user or determining by the arm 520 a speed for record playback; (3) coupling the arm 520 to the spindle; (4) powering on the arm 520; and (5) playing the record. In one embodiment, a first track may be selected by pushing a button 530 the same number of times as the desired track. The arm 520 may also be turned off by holding the button 530 down for a set duration of time, such as for three seconds. In another embodiment, the button 530 may be pushed quickly to pause or mute the record playback. Alternatively, these operation functions may be controlled remotely via the App.

Figure 6:
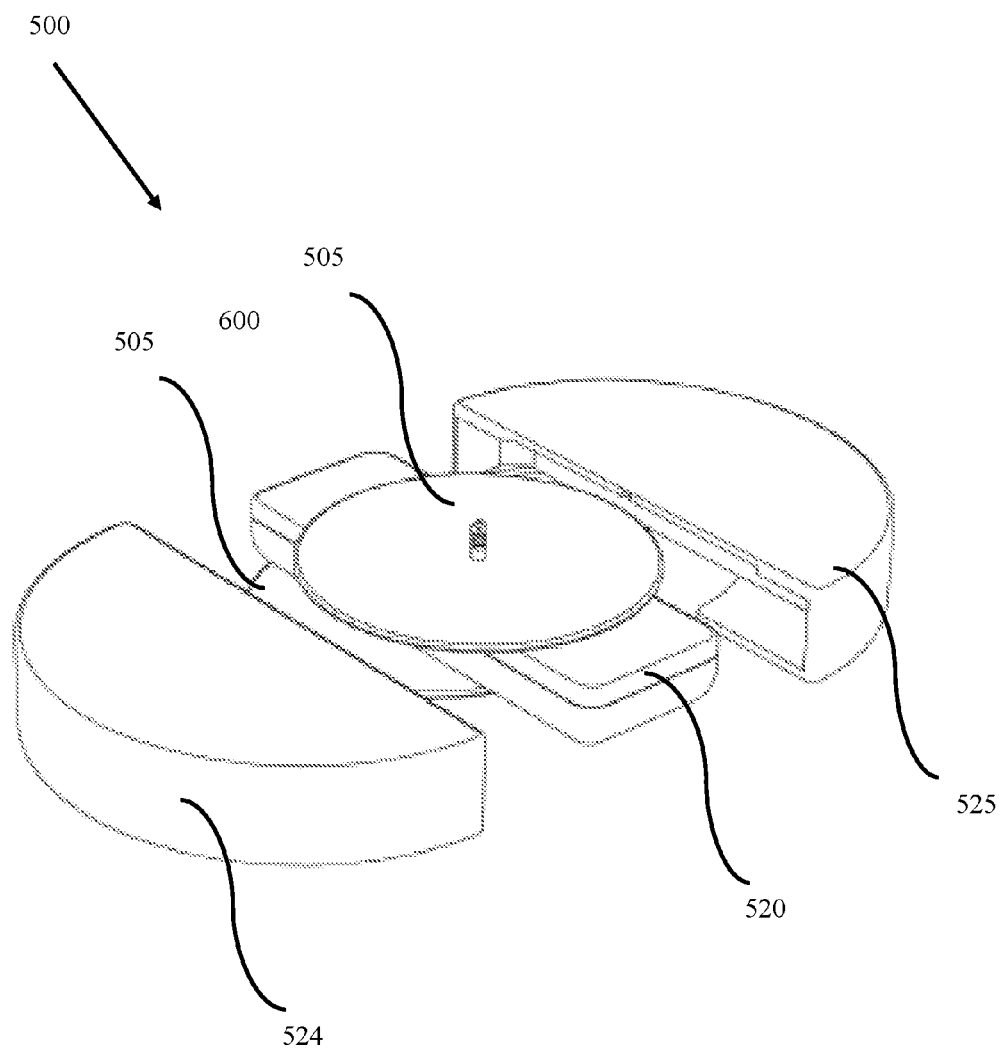
FIG. 6 is an illustration of a perspective view of one embodiment of a turntable device with speakers in a partially stowed configuration.

FIG. 6 is an illustration of a perspective view of one embodiment of a turntable device with speakers in a partially stowed configuration. As shown in FIG. 6, one way to carry and protect the turntable device 500 is to use the substantially hollow interior of the speakers 524, 525 as a storage receptacle. In this manner, the turntable device 500 and the speakers 524, 525 may form a stowed configuration. When the turntable device 500 is in the stowed configuration, the speakers 524, 525 may be able to store two bases 505 and an arm 520. The arm 520 may be positioned between the bases 505 such that the spindle 600 may be adapted to hold and support the arm 520 when the arm 520 is engaged with the spindle 600.

The speakers 524, 525 as shown may be generally semi-circular, but any outward shape or design may be used. The shape of the interior of speakers 524, 525 is preferably designed to allow the device 500 to fit matingly within. Optionally, a USB charging cable may be used to wrap around the components to secure the turntable device 500 in its stowed configuration.

Figure 7:
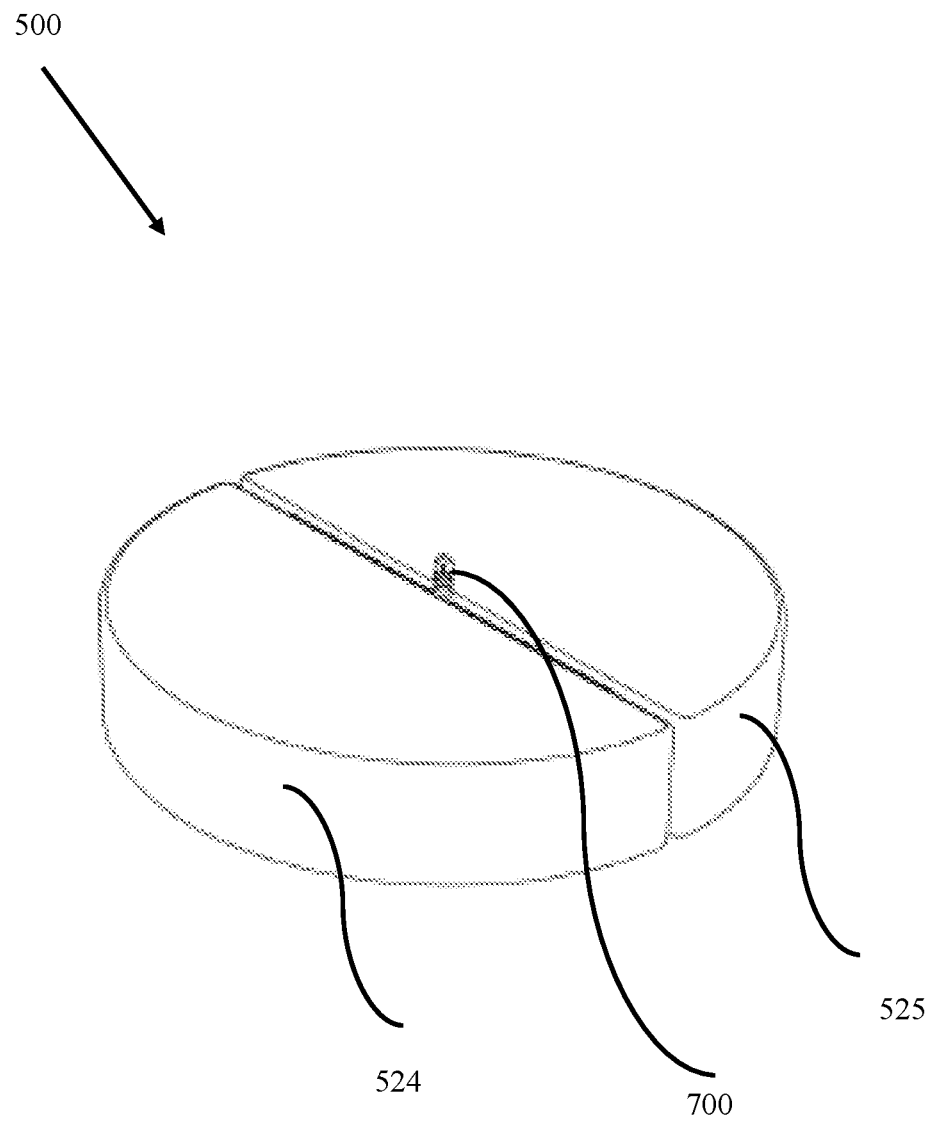
FIG. 7 is an illustration of a perspective view of one embodiment of a turntable device with speakers in a stowed configuration.

FIG. 7 is an illustration of an perspective view of one embodiment of a turntable device with speakers in a stowed configuration. As shown in FIG. 7, the turntable device 500 may be stored within a substantially hollow interior of the speakers 524, 525. In this manner, the speakers 524, 525 may comprise one or more fasteners, which may be configured to hold the turntable device 500 in a stowed configuration. Alternatively, the speakers 524, 525 may matingly fit together and be joined via friction or another connector. The spindle 700 may or may not protrude through the top of the speakers 524, 525.

Figure 8:
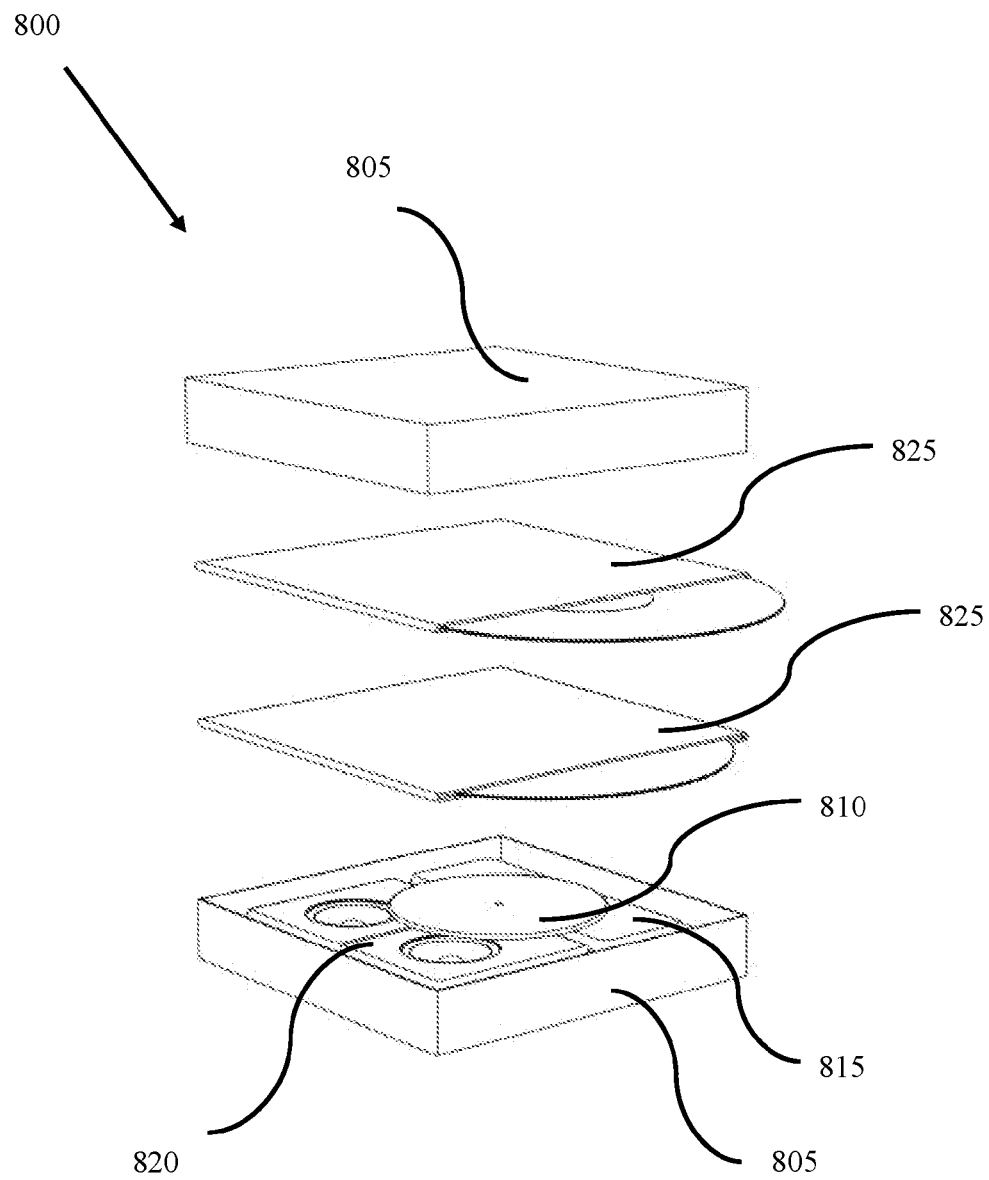
FIG. 8 is an illustration of a perspective view of another embodiment of a turntable device in a partially stowed configuration.

FIG. 8 is an illustration of a perspective view of another embodiment of a turntable device with speakers in a partially stowed configuration. As shown in FIG. 8, one or more arms 815, bases 810, records 825, and speakers 820 may be stored within a storage receptacle 805, also called a housing. When the turntable device 800 is in the stowed configuration, the storage receptacle 805 may be able to store at least two of each of the following: bases 810, arms 815, speakers 820, and records 825.

In one embodiment, the turntable may have a tilting function, wherein when the bottom side is up, the arm is in standby mode, and wherein when the bottom side is down on a record, the arm is in auto play mode (wherein there is no need to press any button to begin play).

In some embodiments the base may have a large spindle or large tab that is configured to engage with the large hole of 7" records without the need for an adaptor.

Figure 9:
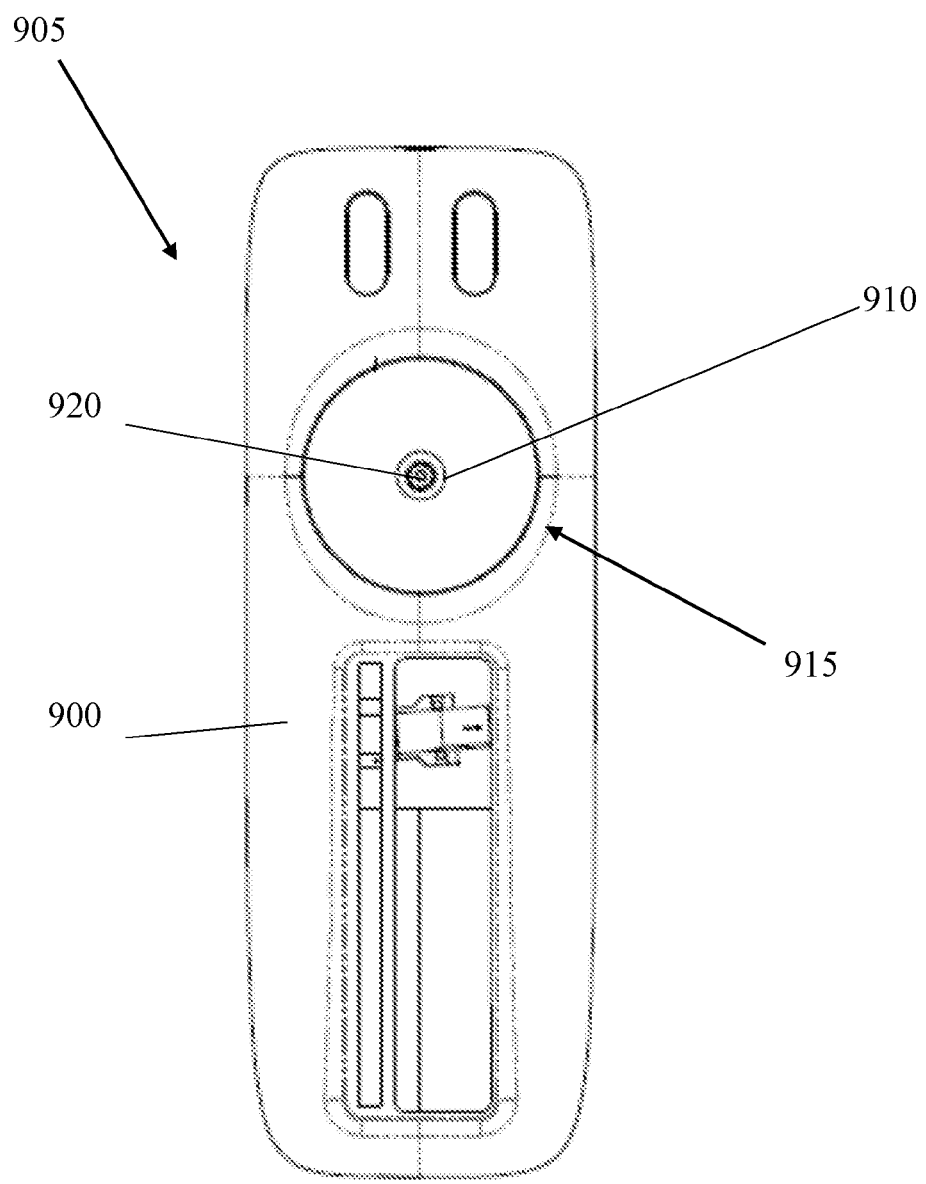
FIG. 9 is an illustration of a bottom plan view of one embodiment of an arm of the turntable device.

FIG. 9 is an illustration of a bottom plan view of one embodiment of an arm of the turntable device. As shown in FIG. 9, the bottom housing 900 of the arm 905 may comprise a spinning or static pad 915. In one embodiment, the pad 915 may replace one or more support wheels adapted to engage within the inner circle of a record (e.g., inside label of the record). Accordingly, the pad 915 may provide stability and grip when the arm 905 is engaged with the inner circle of a record. The center 910 of the pad 915 may comprise a spindle engagement portion 920. The spindle engagement portion 920 may be part of or integrated with the housing 900.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A turntable device for playing both sides of a record simultaneously, comprising:
   a spindle; and
   two arms, a first arm and a second arm, each arm comprising:
      a housing;
      one or more buttons;
      a spindle engagement portion;
      a stylus cartridge;
      a power supply;
      one or more wireless communication devices;
      a linear actuator;
      a motor; and
      a vertical solenoid;

wherein said spindle is adapted to operatively engage with a phonographic record and said two arms;

wherein said first arm is positioned above said phonographic record and said second arm is positioned below said phonographic record;

wherein said spindle engagement portions of said two arms engage with said spindle, such that said phonographic record is entirely supported above said second arm via said spindle and said second arm is entirely supported above said phonographic record via said spindle;

wherein said first arm plays a top side of said phonographic record at the same time that said second arm plays an underside of said phonographic record;

wherein within each of said two arms said linear actuator is configured to move said stylus cartridge along a length of said two arms; and wherein within each of said two arms said vertical solenoid is configured to allow a stylus of said stylus cartridge to engage with said phonographic record.

2. The turntable device of claim 1, wherein each of said two arms further comprise one or more sensors;

wherein said one or more sensors are configured to cause said linear actuator to move said stylus cartridge along said length of one of said two arms in order to begin a desired track on said phonographic record.

3. The turntable device of claim 2, wherein said two arms are configured to automatically determine a speed of said phonographic record.

4. The turntable device of claim 2, wherein each of said two arms further comprise a speed switch that allows a user to manually select a revolution speed that conforms with a speed of said phonographic record.

5. The turntable device of claim 2, wherein said one or more buttons is a single button that allows a user to control a plurality of operating functions of said two arms;

wherein said plurality of operating functions of said two arms are selected from the group of operating functions consisting of: turning on; turning off; selecting said desired track;

skipping one or more tracks; pausing; and muting.

6. The turntable device of claim 2, wherein said one or more buttons is a display touch screen.

7. The turntable device of claim 6, wherein said display touch screen allows a user to control a plurality of operating functions of said two arms;

wherein said plurality of operating functions of said two arms are selected from the group of operating functions consisting of: turning on; turning off; selecting said desired track;

skipping one or more tracks; pausing; and muting.

8. The turntable device of claim 1, wherein each of said two arms further comprises a display;

wherein said phonographic record has a plurality of tracks;

wherein said display shows which track of said plurality is currently being played.

9. The turntable device of claim 2, wherein said two arms further comprise a circuit board;

wherein said one or more wireless communication devices are coupled to said circuit board and are configured to send and receive signals from one or more computing devices.

10. The turntable device of claim 9, wherein said one or more computing devices comprise a software application.

11. The turntable device of claim 10, wherein said software application is configured to allow a user to control a plurality of operating functions of said two arms from said one or more computing devices;

wherein said plurality of operating functions of said two arms are selected from the group of operating functions consisting of: turning on; turning off; selecting said desired track; skipping one or more tracks; selecting a record speed; alarm clock function; pausing; and muting.

12. The turntable device of claim 11, wherein said one or more computing devices are one or more mobile smartphones.

13. The turntable device of claim 2, wherein said wherein each of said two arms is configured to send or receive data or sound to an external device.

14. The turntable device of claim 13, wherein said external device is selected from the group of external devices consisting of: speakers; headphones; and one or more computing devices.

15. The turntable device of claim 13, wherein external device is one or more speakers;

wherein said one or more speakers have a substantially hollow interior;

wherein said substantially hollow interior of said one or more speakers is used as a storage receptacle for said turntable device; and wherein said storage receptacle is configured to receive and store at least one arm and at least one base.

16. A turntable device, comprising:
a base;
two speakers;
a spindle; and
at least one arm, said at least one arm comprising:
  a housing;
  one or more buttons;
  a spindle engagement portion;
  a stylus cartridge;
  one or more wireless communication devices;
  a linear actuator; and
  a vertical solenoid;
wherein said base is adapted to receive a phonographic record;

wherein said spindle engagement portion is configured to engage with said spindle;

wherein said arm is configured to revolve around said base at said spindle;

wherein said linear actuator is configured to move said stylus cartridge along a length of said arm;

wherein said vertical solenoid is configured to allow a stylus of said stylus cartridge to engage with said phonographic record that is loaded on said base; and wherein each of said two speakers have a substantially hollow interior, such that said two speakers, when combined, are configured to receive and store said arm, said spindle, and said base.

17. The turntable device of claim 16, wherein said arm further comprises one or more sensors;

wherein said one or more sensors are configured to cause said linear actuator to move said stylus cartridge along said length of said arm in order to begin a desired track on said phonographic record.

18. The turntable device of claim 17, wherein said arm is configured to automatically determine a speed of said phonographic record.

* * * * *